UNITED STATES PATENT OFFICE.

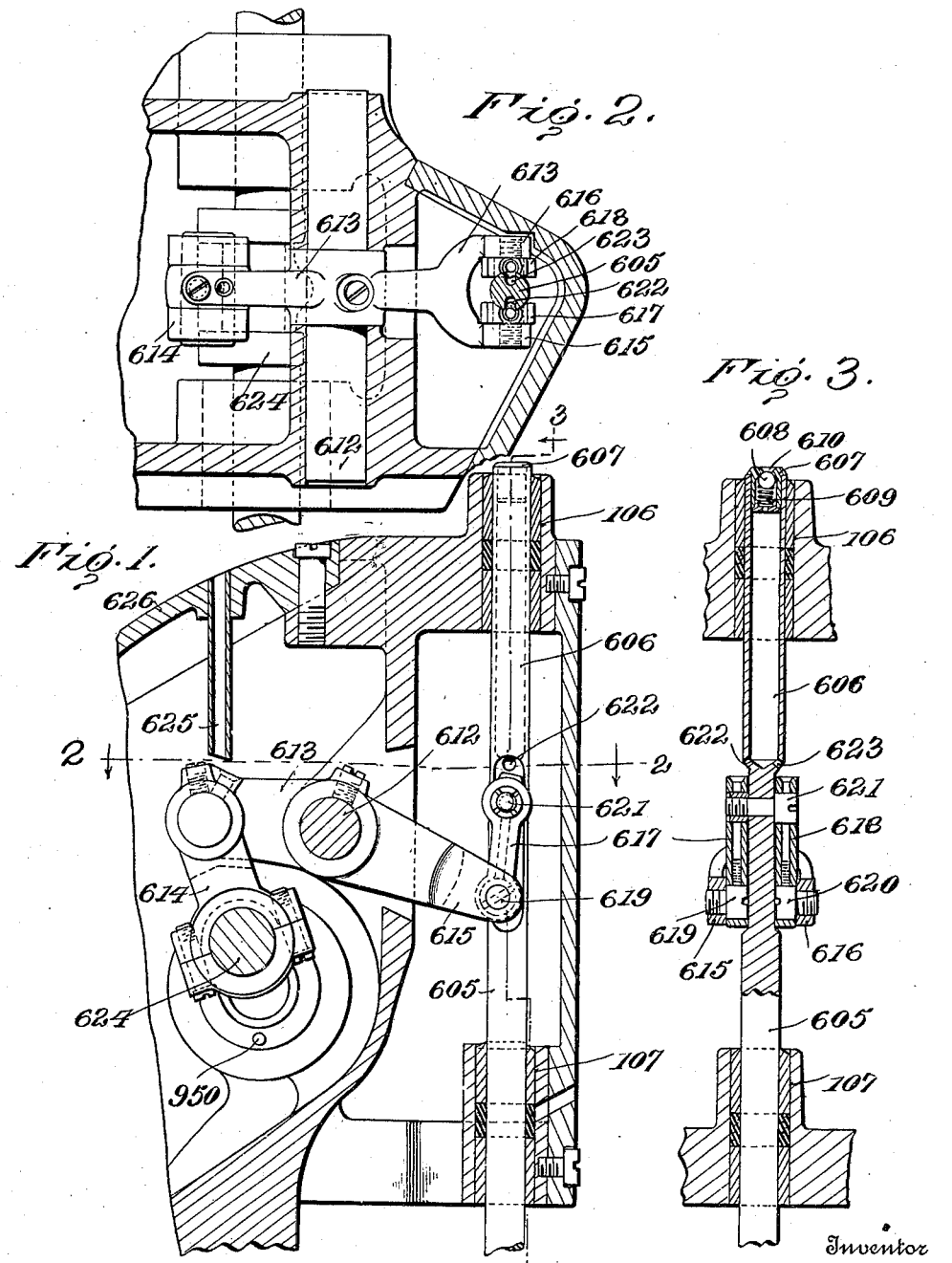

ARTHUR A. MERRITT, OF WORCESTER, MASSACHUSETTS, ASSIGNOR TO WILLCOX & GIBBS SEWING MACHINE COMPANY, OF NEW YORK, N. Y., A CORPORATION OF NEW YORK.

NEEDLE-BAR-DRIVING CONNECTION.

1,041,654. Specification of Letters Patent. Patented Oct. 15, 1912.

Original application filed December 12, 1908, Serial No. 467,163. Divided and this application filed January 12, 1910, Serial No. 537,681. Renewed August 1, 1912. Serial No. 712,772.

*To all whom it may concern:*

Be it known that I, ARTHUR A. MERRITT, of Worcester, Massachusetts, have invented a new and useful Improvement in Needle-Bar-Driving Connections, which invention is fully set forth in the following specification.

This is a division of my application filed December 12th, 1908, Serial No. 467,163, for improvements in sewing machines.

The present invention, which relates to improvements in needle-bar driving connections, will be readily understood by reference to the illustration in the accompanying drawing of what is at present regarded as the preferred embodiment thereof.

In said drawing, Figure 1 is a vertical sectional view through the head of a sewing machine having the invention applied thereto; Fig. 2 is a transverse section on line 2—2 of Fig. 1; and Fig. 3 is a vertical section through the needle-bar on line 3—3 of Fig. 1.

Referring to the drawings, 605 is a needle-bar vertically movable in upper bearing 106 and lower bearing 107 in the head of the machine; said needle-bar is made hollow at its upper end to provide a small lubricant reservoir 606 closed at its upper extremity by a tightly fitting plug 607. The reservoir may be filled with fibrous material, such as waste. A valve consisting of a ball 608 normally pressed upward to its seat by a spring 609 closes an opening 610 through the plug for introduction of lubricant into the reservoir. The valve may be opened by pressing upon the ball with the tapered end of an oil can from which the lubricant flows through the plug. 613 is a rock-lever the driving end of which is bifurcated or forked, the two arms being designated 615 and 616. These arms are pivotally connected to the lower ends of links 617 and 618 respectively by screws 619 and 620, a flattened inner surface on each arm closely contacting a coacting flattened outer surface at the lower end of its corresponding link. Each of these screws has a threaded portion engaging a threaded opening in the end of its arm, while the head of the screw is of cylindrical form and extends inward from the arm into an opening in the lower end of its corresponding link. The links 617 and 618 lie along and for approximately their entire length bear against flattened surfaces oppositely formed on the needle-bar 605. Each link has a flattened inner surface closely fitting and bearing against its coacting surface of the needle-bar. The coacting flattened surfaces of the needle-bar 606, links 617 and 618 and arms 615 and 616, materially assist in preventing twisting or turning of the needle-bar. At their upper ends both links are pivotally connected to the needle-bar by a screw 621; a cylindrical head at one end of the screw constitutes the pivot on which one link is free to turn, and a cylindrical nut on the other side of the needle-bar, and engaged by the thread of the screw, forms the pivot on which the other link is free to turn. The forked end of the rock-lever, by embracing both links and the needle-bar, holds the links in position in engagement with their pivots and in contact with the flattened oppositely formed surfaces of the needle-bar. Vertical passages extend longitudinally through both links, intercepting at their upper ends the cylindrical openings in which the head and nut of screw 621 engage, and at their lower ends the cylindrical openings in which the heads of screws 619 and 620 engage, thus conducting lubricant to the pivotal bearings at both ends of the links. Lateral openings 622 and 623 from the bottom of the reservoir 606 deliver lubricant from the latter into the upper ends of the openings through the links. Rock-arm 613 is fixed to a rock shaft 612, and is driven through a pivotal connection at its driven end with a short pitman or link 614 driven from a crank 624 on the main shaft.

In Fig. 1 there is shown a tube 625 depending from the cover 626 through which lubricant may be introduced to lubricate the connection between the pitman 614 and the rock arm 613.

By thus providing a double link connection, the links being symmetrically disposed on opposite sides of the needle-bar, the application of driving power to the latter is equally balanced, and tendency to turn or twist the needle-bar in its bearings is avoided, at the same time preventing misplacement of the needles due to slight shifting of the needle bar, occasioned by wear or unequal application of the driving power thereto, as may be the case for example with a link connection on one side only of the bar.

What is claimed is:—

1. In a sewing machine, the combination of a needle-bar; two links lying along opposite sides of the needle-bar and pivoted thereto; and a driving member having a forked end embracing the links and needle-bar, the arms of said fork being pivoted to the links respectively.

2. In a sewing machine, the combination of a needle-bar; two links lying along opposite sides of the needle-bar; pivot-studs projecting from the needle-bar into pivot-openings in said links; a driving member having a forked end embracing the links and holding the same in place against opposite sides of the needle-bar; and pivot-studs connecting the arms of the forked end of the driving member and the links respectively.

3. The combination of a needle-bar; a driving member; and one or more links pivoted to said needle-bar and driving member, each link having a lubricant passage or chamber communicating with its pivots, and said needle-bar being hollowed to form a lubricant reservoir having an outlet leading to the chamber in the link or links.

4. The combination of a needle-bar; a driving member; one or more links pivoted to said needle-bar and driving member, each link having a lubricant passage or chamber communicating with its pivots, and said needle-bar being hollowed at its upper end to form a lubricant reservoir having an outlet leading to the chamber in the link or links, and a spring-actuated valve closing the upper end of the reservoir in the needle-bar.

5. In a sewing machine, the combination of a needle-bar; driving means; and two links lying along opposite sides of the needle-bar and pivotally connected thereto and to the driving means, each link having a flattened inner surface which for approximately the length of the link closely fits and bears against a coacting flattened surface of the needle-bar.

6. In a sewing machine, the combination of a needle-bar; two links lying along opposite sides of the needle-bar and pivoted thereto, each link having a flattened inner surface closely fitting and bearing against a coacting flattened surface of the needle-bar; and driving means having two arms pivoted respectively to the links, each arm having a flattened surface closely fitting against a flattened outer surface of its corresponding link.

In testimony whereof I have signed this specification in the presence of two subscribing witnesses.

ARTHUR A. MERRITT.

Witnesses:
H. A. W. HAYWARD,
BURTON V. MORSE.

---

Copies of this patent may be obtained for five cents each, by addressing the "Commissioner of Patents, Washington, D. C."